United States Patent
Matečić Mušanić et al.

(10) Patent No.: US 12,492,214 B2
(45) Date of Patent: Dec. 9, 2025

(54) SOLID STATE FORMS OF RISDIPLAM AND PROCESS FOR PREPARATION THEREOF

(71) Applicant: ASSIA CHEMICAL INDUSTRIES LTD., Tel Aviv (IL)

(72) Inventors: Sanja Matečić Mušanić, Zagreb (HR); Dario Klaric, Zapresic (HR); Mateja Kolenic, Krizavci (HR)

(73) Assignee: ASSIA CHEMICAL INDUSTRIES LTD., Tel Aviv (IL)

( * ) Notice: Subject to any disclaimer, the term of this patent is extended or adjusted under 35 U.S.C. 154(b) by 985 days.

(21) Appl. No.: 17/631,028

(22) PCT Filed: Jul. 28, 2020

(86) PCT No.: PCT/US2020/043815
§ 371 (c)(1),
(2) Date: Jan. 28, 2022

(87) PCT Pub. No.: WO2021/021775
PCT Pub. Date: Feb. 4, 2021

(65) Prior Publication Data
US 2022/0315607 A1 Oct. 6, 2022

Related U.S. Application Data

(60) Provisional application No. 62/911,455, filed on Oct. 7, 2019, provisional application No. 62/880,734, filed on Jul. 31, 2019.

(51) Int. Cl.
*C07D 519/00* (2006.01)
*A61P 21/00* (2006.01)

(52) U.S. Cl.
CPC .......... *C07D 519/00* (2013.01); *A61P 21/00* (2018.01); *C07B 2200/13* (2013.01)

(58) Field of Classification Search
CPC .... C07D 519/00; A61P 21/00; C07B 2200/13
See application file for complete search history.

(56) References Cited

FOREIGN PATENT DOCUMENTS

| WO | 2013119916 A2 | 8/2013 | |
|---|---|---|---|
| WO | 2015173181 A1 | 11/2015 | |
| WO | 2019057740 A1 | 3/2019 | |
| WO | WO-2020079203 A1 * | 4/2020 | ........... C07D 519/00 |

OTHER PUBLICATIONS

European Examination Report issued in corresponding application EP 20757065.6 dated Mar. 21, 2024 (4 pages).
International Search Report and Written Opinion of the International Searching Authority issued in corresponding application PCT/US2020/043815 mailed Sep. 29, 2020 (12 pages).

* cited by examiner

*Primary Examiner* — Sarah Pihonak
*Assistant Examiner* — Mikhail O'Donnel Robinson
(74) *Attorney, Agent, or Firm* — Carter, DeLuca & Farrell LLP

(57) ABSTRACT

The present disclosure encompasses solid state forms of Risdiplam, including crystalline polymorphs of Risdiplam, processes for preparation thereof, and pharmaceutical compositions thereof.

21 Claims, 10 Drawing Sheets

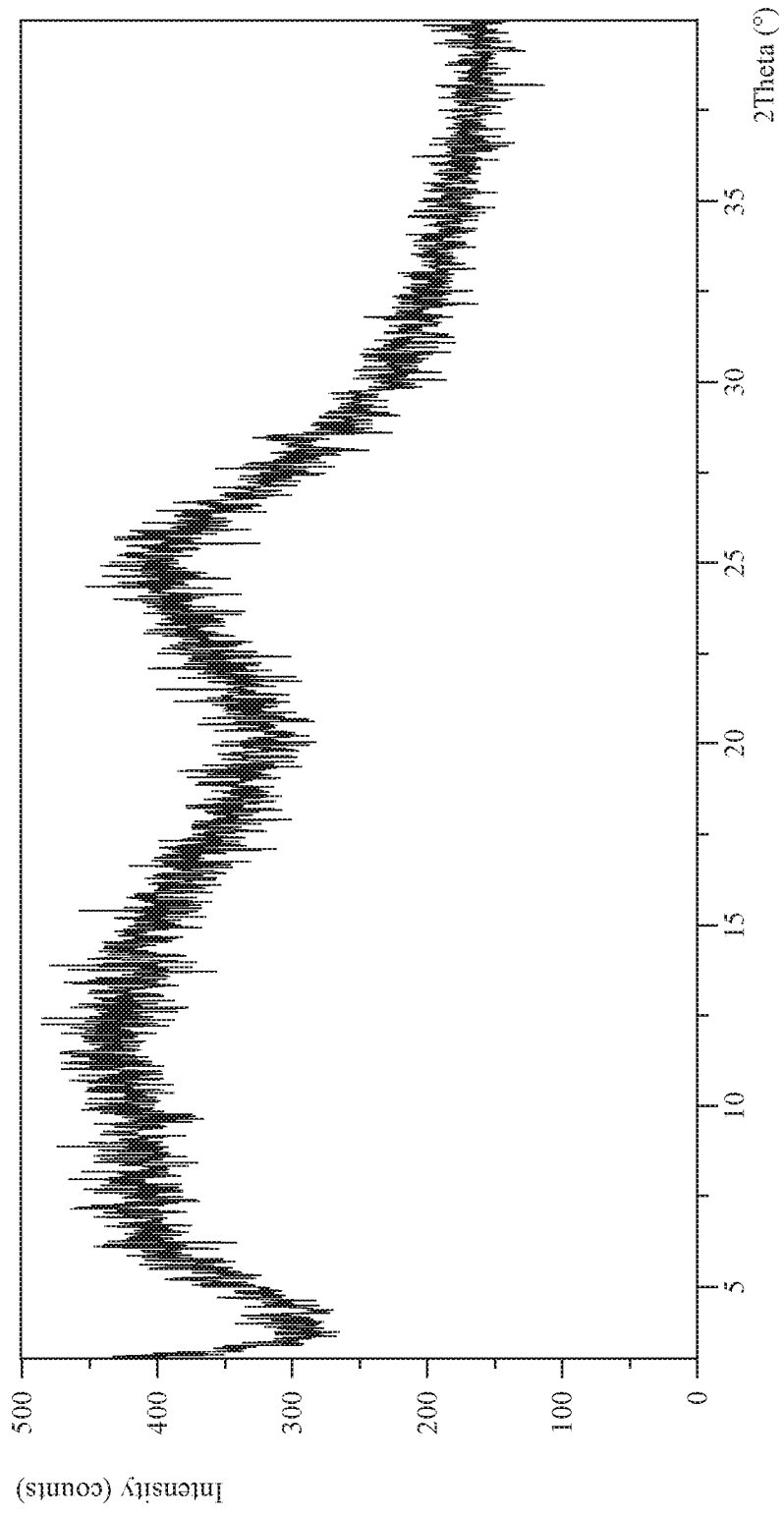

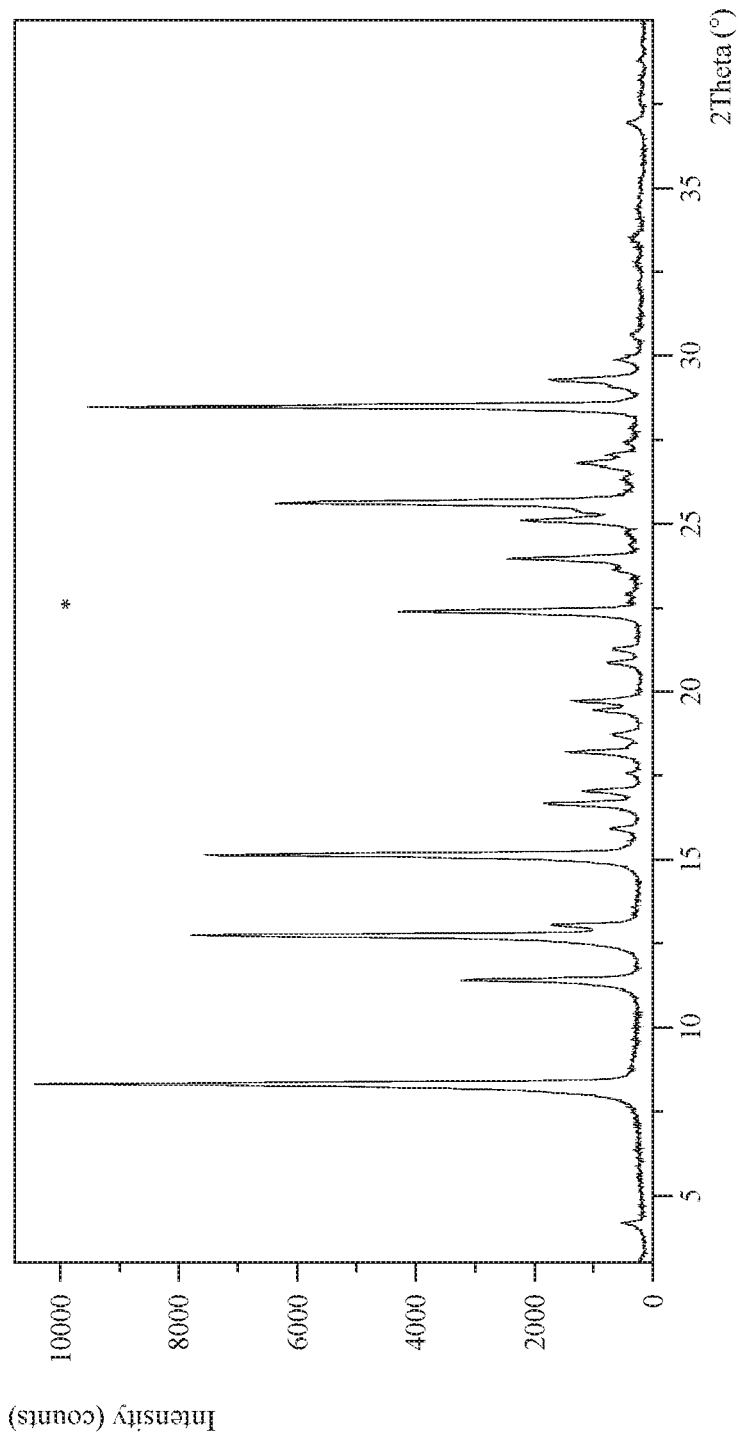
Figure 2. A characteristic XRPD of Risdiplam Form 1
* the peak at 28.47 belongs to silicon

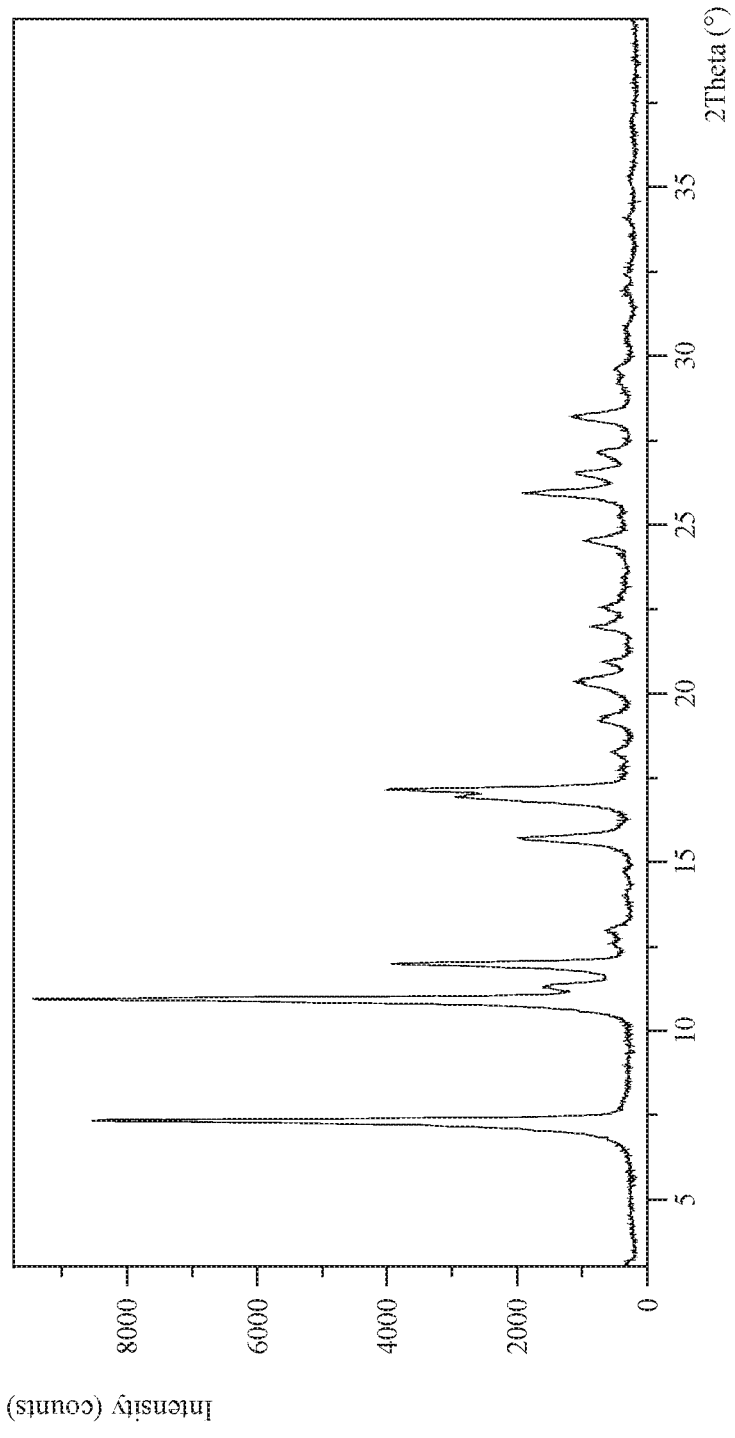
Figure 3: A characteristic XRPD of Risdiplam Form 2

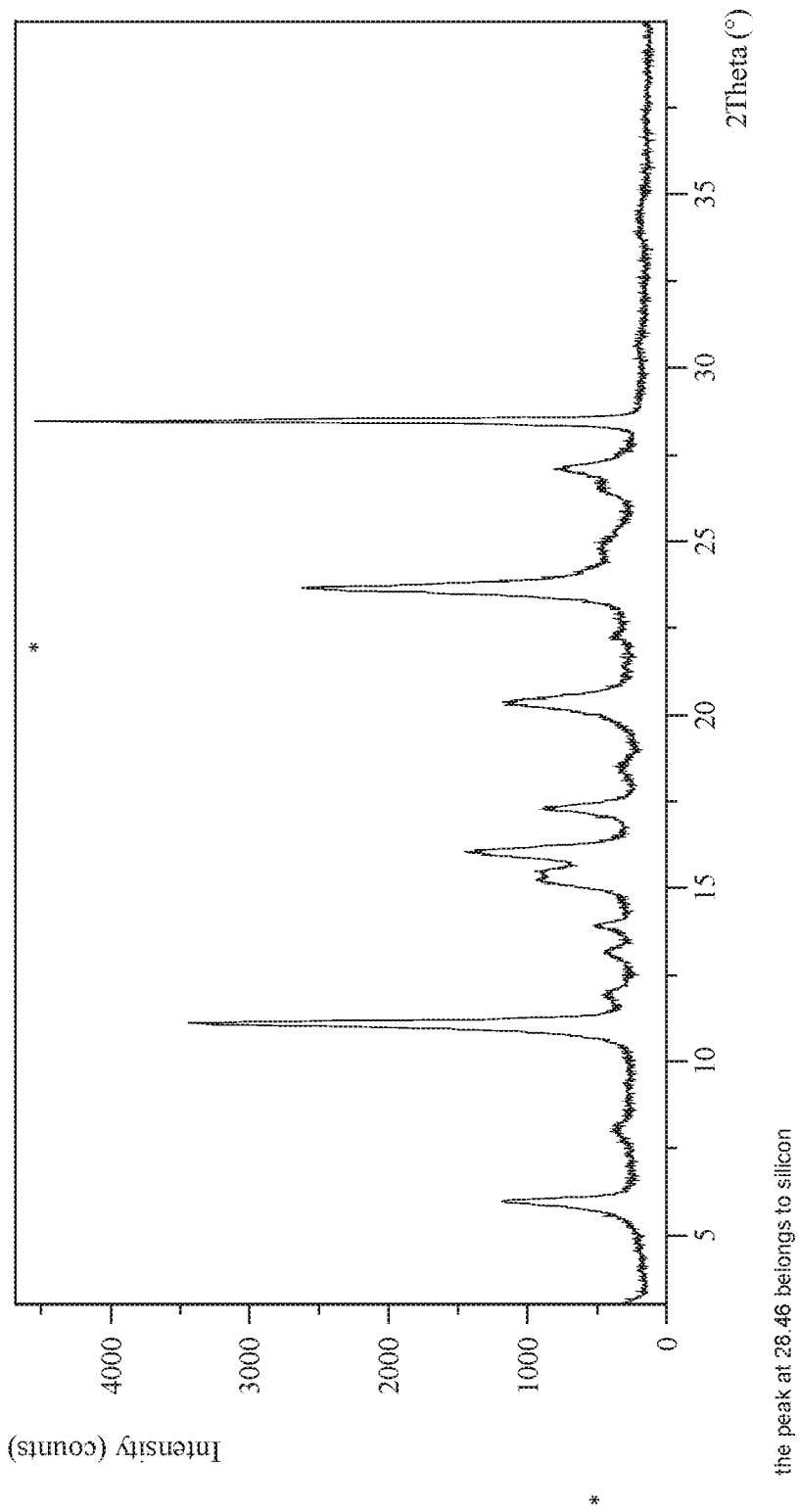
Figure 4: A characteristic XRPD of Risdiplam Form 3
the peak at 28.46 belongs to silicon

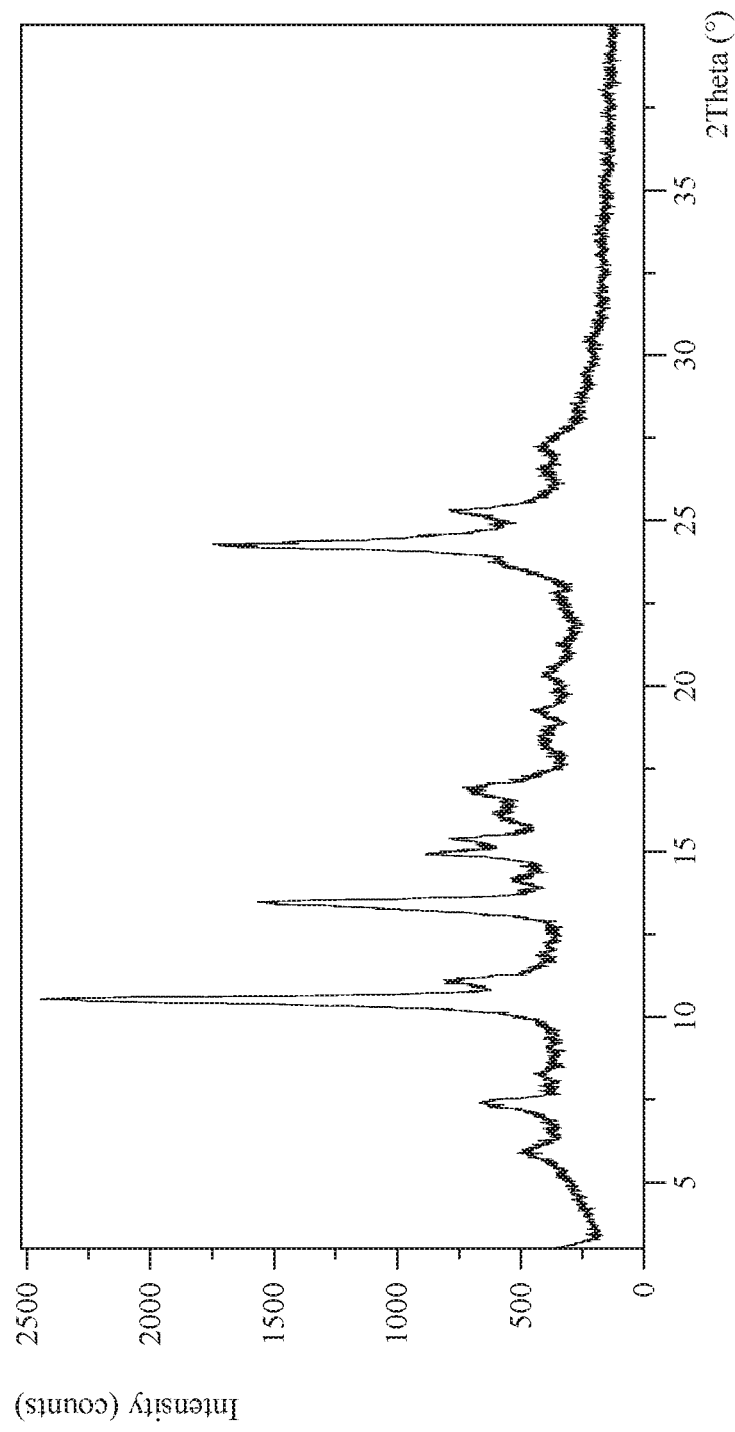
Figure 5: A characteristic XRPD of Risdiplam Form 4

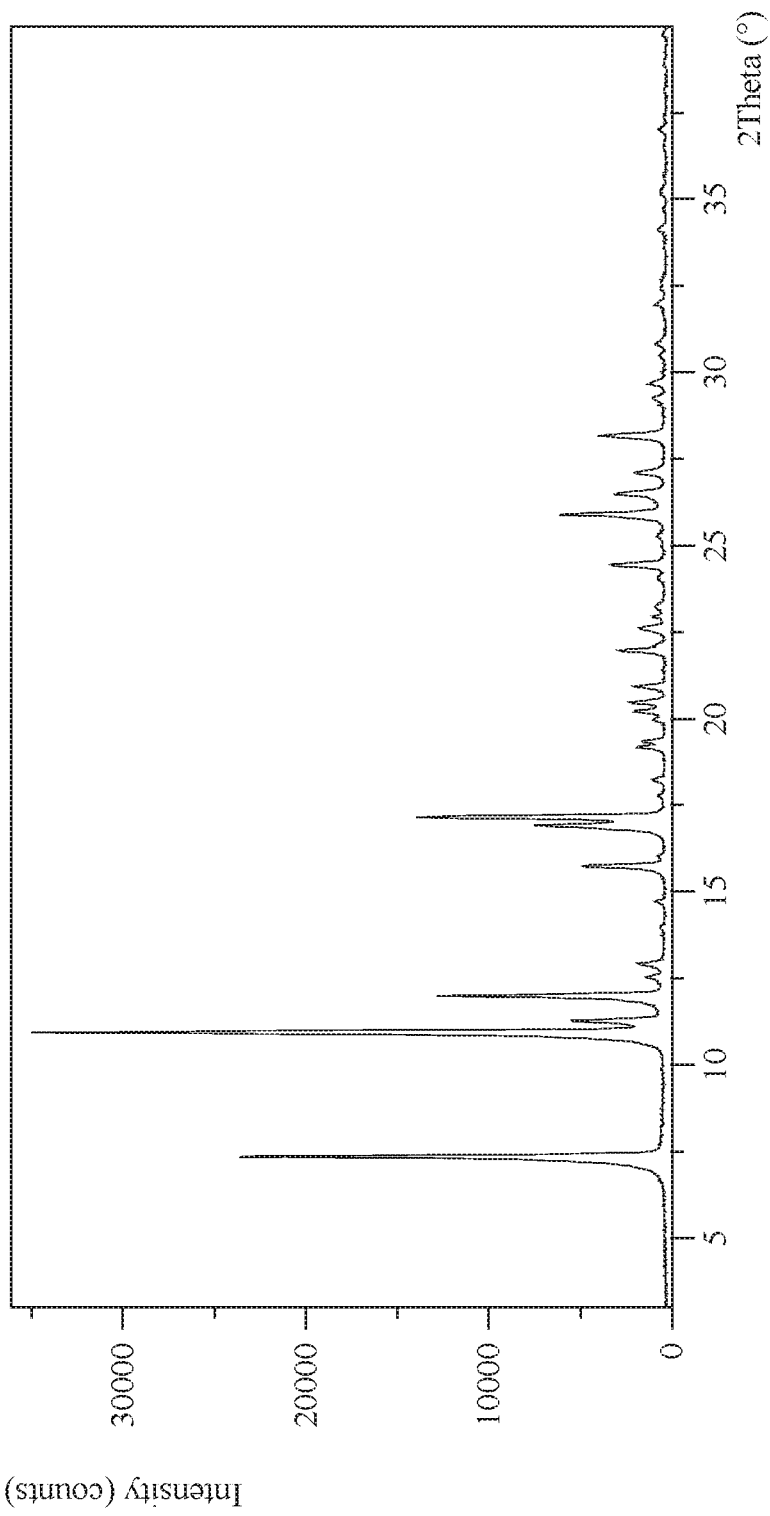
Figure 6: A characteristic XRPD of Risdiplam Form 2

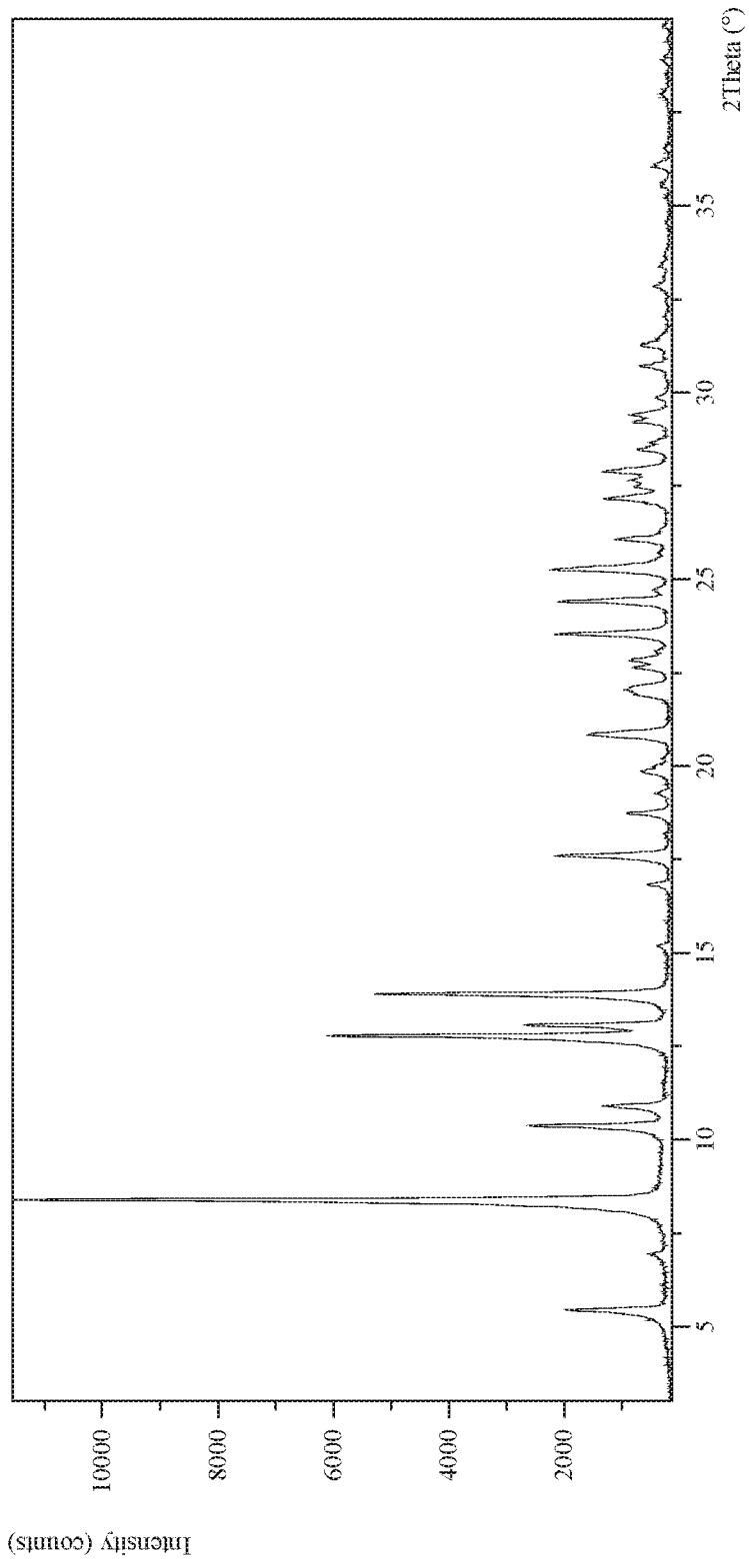
Figure 7. A characteristic XRPD of Risdiplam Form 5

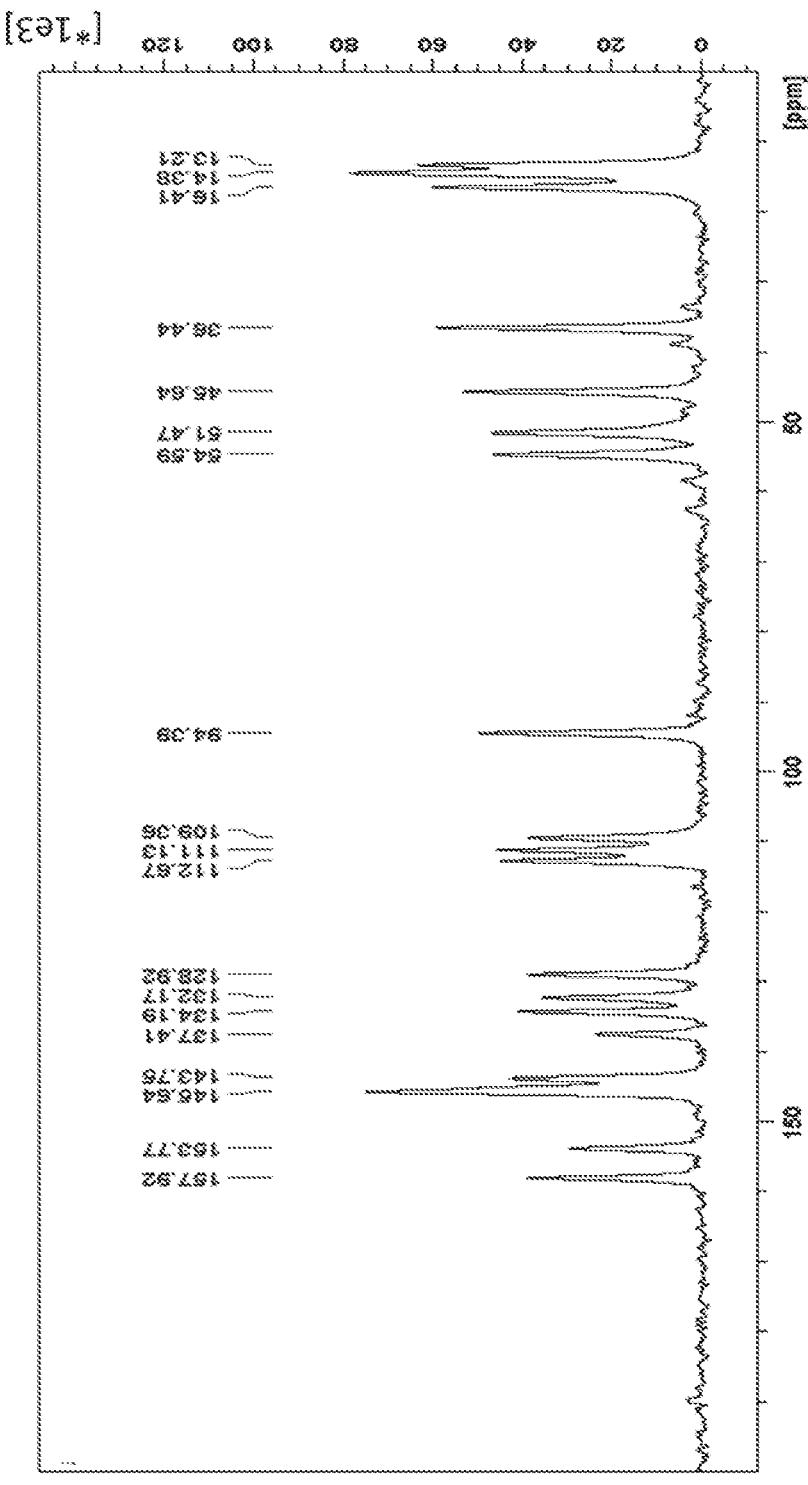
Figure 8: A solid state ¹³C NMR spectrum of Form 2

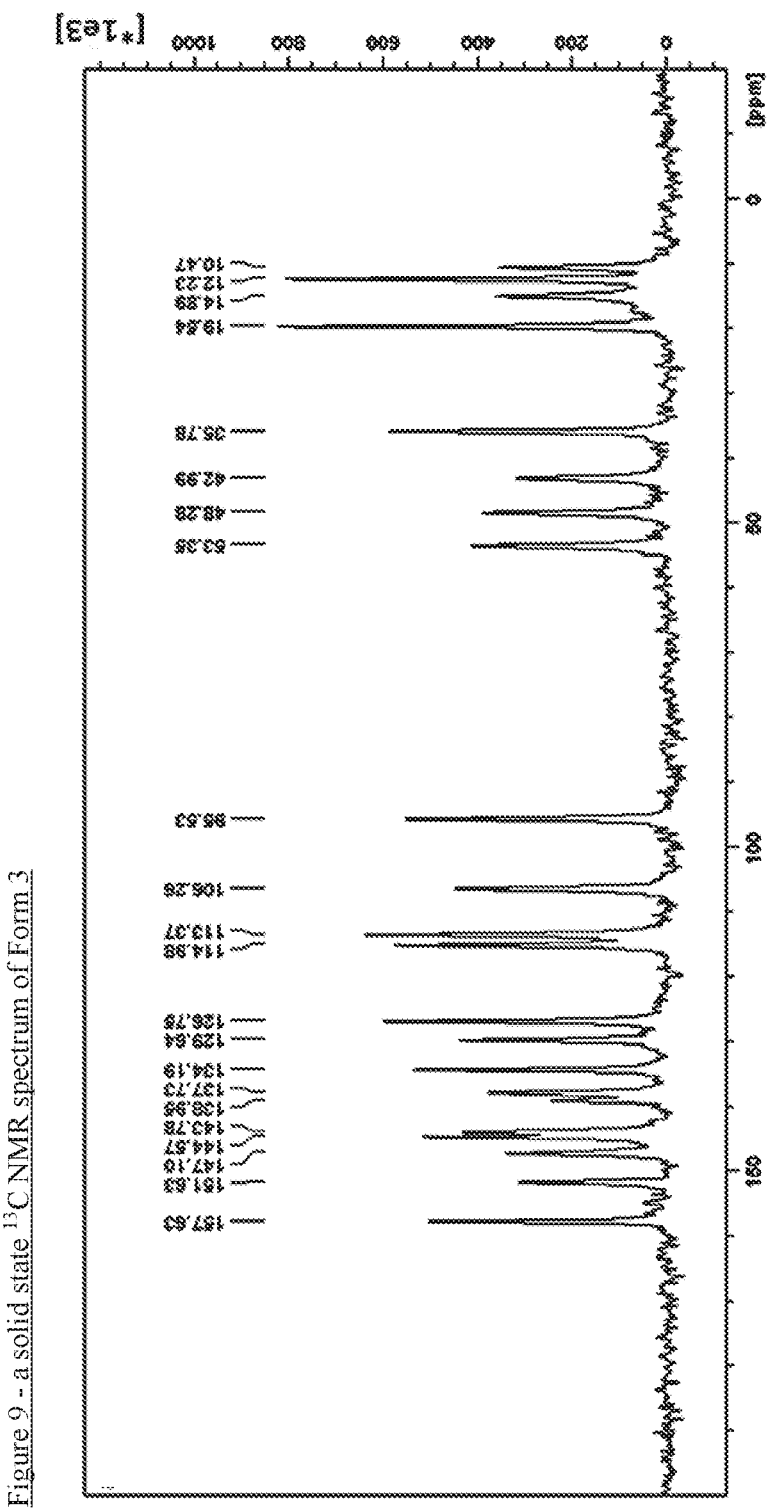
Figure 9 – a solid state $^{13}$C NMR spectrum of Form 3

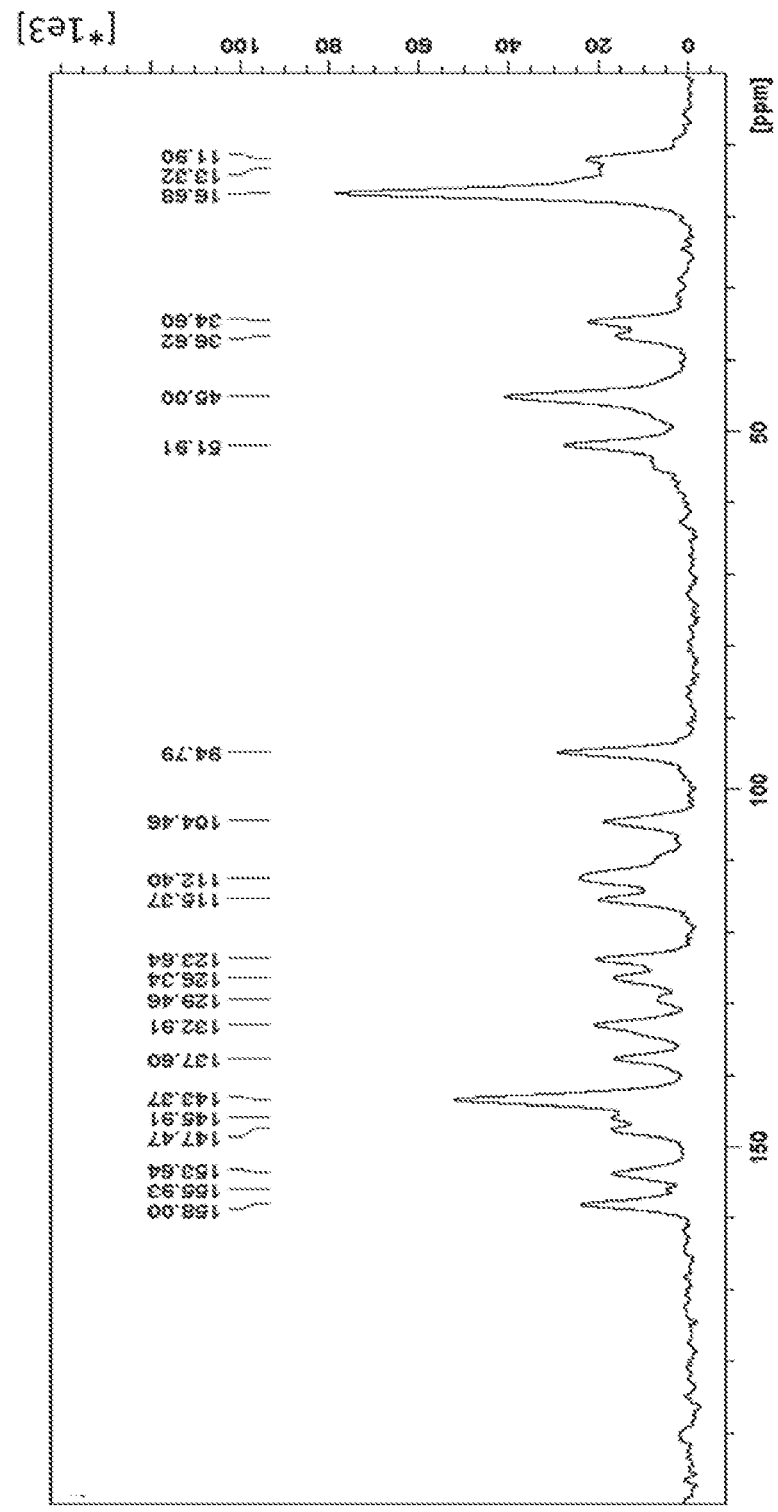
Figure 10: a solid state $^{13}$C NMR spectrum of Form 4

SOLID STATE FORMS OF RISDIPLAM AND PROCESS FOR PREPARATION THEREOF

CROSS REFERENCE TO RELATED APPLICATIONS

This application is a National Stage of, and claims priority to and the benefit of, International Patent Application No. PCT/US2020/043815, filed Jul. 28, 2020, which, in turn, claims the benefit of and priority to, U.S. Provisional Application No. 62/880,734, filed Jul. 31, 2019, and U.S. Provisional Application No. 62/911,455, filed Oct. 7, 2019, the entire disclosures of each of which are incorporated by reference herein.

FIELD OF THE DISCLOSURE

The present disclosure encompasses solid state forms of Risdiplam, including crystalline polymorphs of Risdiplam, processes for preparation thereof, and pharmaceutical compositions thereof.

BACKGROUND OF THE DISCLOSURE

Risdiplam, 7-(4,7-diazaspiro[2.5]octan-7-yl)-2-(2,8-dimethylimidazo[1,2-b]pyridazin-6-yl)-4H-pyrido[1,2-a]pyrimidin-4-one has the following chemical structure:

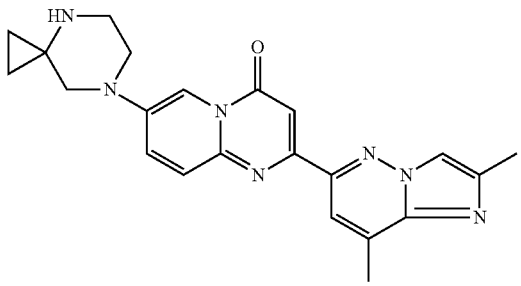 [SMILES: Cc1cn2nc(-c3cc(=O)n4cc(N5CCNC6(CC6)C5)ccc4n3)cc(C)c2n1]

Risdiplam is described in International Publication No. WO 2015/173181 as a compound which belongs to SMN2 gene splicing modulators that are used as medicaments for the treatment of spinal muscular atrophy (SMA). The term "spinal muscular atrophy" relates to a disease caused by loss of SMN1 gene function. The symptoms of which can include, inter alia, muscle weakness, difficulty in swallowing and breathing.

Certain crystalline forms of Risdiplam are disclosed in International Publication No. WO 2020/079203.

Polymorphism, the occurrence of different crystalline forms, is a property of some molecules and molecular complexes. A single molecule may give rise to a variety of polymorphs having distinct crystal structures and physical properties like melting point, thermal behaviors (e.g., measured by thermogravimetric analysis—"TGA", or differential scanning calorimetry—"DSC"), X-ray diffraction (XRD) pattern, infrared absorption fingerprint, and solid state ($^{13}$C) NMR spectrum. One or more of these techniques may be used to distinguish different polymorphic forms of a compound.

Different salts and solid state forms (including solvated forms) of an active pharmaceutical ingredient may possess different properties. Such variations in the properties of different salts and solid state forms and solvates may provide a basis for improving formulation, for example, by facilitating better processing or handling characteristics, changing the dissolution profile in a favorable direction, or improving stability (polymorph as well as chemical stability) and shelf-life. These variations in the properties of different salts and solid state forms may also offer improvements to the final dosage form, for instance, if they serve to improve bioavailability. Different salts and solid state forms and solvates of an active pharmaceutical ingredient may also give rise to a variety of polymorphs or crystalline forms, which may in turn provide additional opportunities to assess variations in the properties and characteristics of a solid active pharmaceutical ingredient.

Discovering new solid state forms and solvates of a pharmaceutical product may yield materials having desirable processing properties, such as ease of handling, ease of processing, storage stability, and ease of purification or as desirable intermediate crystal forms that facilitate conversion to other polymorphic forms. New solid state forms of a pharmaceutically useful compound can also provide an opportunity to improve the performance characteristics of a pharmaceutical product. It enlarges the repertoire of materials that a formulation scientist has available for formulation optimization, for example by providing a product with different properties, e.g., a different crystal habit, higher crystallinity, or polymorphic stability, which may offer better processing or handling characteristics, improved dissolution profile, or improved shelf-life (chemical/physical stability). For at least these reasons, there is a need for additional solid state forms (including solvated forms) of Risdiplam.

SUMMARY OF THE DISCLOSURE

The present disclosure provides crystalline polymorphs of Risdiplam, processes for preparation thereof, and pharmaceutical compositions thereof. These crystalline polymorphs can be used to prepare other solid state forms of Risdiplam, Risdiplam salts and their solid state forms.

The present disclosure also provides uses of the said solid state forms of Risdiplam in the preparation of other solid state forms of Risdiplam or salts thereof.

The present disclosure also provides the said solid state forms of Risdiplam for use in the preparation of other solid state forms of Risdiplam or salts thereof.

The present disclosure provides crystalline polymorphs of Risdiplam for use in the preparation of pharmaceutical compositions and/or formulations for use in medicine, including for the treatment of SMA.

The present disclosure also encompasses the use of crystalline polymorphs of Risdiplam of the present disclosure for the preparation of pharmaceutical compositions and/or formulations.

The present disclosure further provides a process for preparing a pharmaceutical composition or formulation comprising combining a crystalline form according to the present disclosure with at least one pharmaceutically acceptable excipient.

In another aspect, the present disclosure provides pharmaceutical compositions or formulations including crystalline polymorphs of Risdiplam according to the present disclosure.

In yet another embodiment, the present disclosure encompasses pharmaceutical formulations including the described any one or a combination of the crystalline polymorphs of Risdiplam, or pharmaceutical compositions including the described crystalline polymorphs of Risdiplam and at least one pharmaceutically acceptable excipient. In embodiments the pharmaceutical composition or formulation may be in the form of a tablet, capsule or powder, optionally in the form of a powder, optionally in the form of a powder for solution.

The present disclosure includes processes for preparing the above mentioned pharmaceutical compositions. The processes include combining any one or a combination of the crystalline polymorphs of Risdiplam with at least one pharmaceutically acceptable excipient.

The crystalline polymorph of Risdiplam as defined herein and the pharmaceutical compositions or formulations of the crystalline polymorph of Risdiplam may be used as medicaments, such as for the treatment of SMA.

The present disclosure also provides methods of treating SMA, by administering a therapeutically effective amount of any one or a combination of the crystalline polymorphs of Risdiplam of the present disclosure, or at least one of the above pharmaceutical compositions or formulations, to a subject suffering from SMA, or otherwise in need of the treatment.

The present disclosure also provides the uses of crystalline polymorphs of Risdiplam of the present disclosure, or at least one of the above pharmaceutical compositions or formulations, for the manufacture of medicaments for treating e.g., SMA.

BRIEF DESCRIPTION OF THE DRAWINGS

FIG. 1 shows a characteristic X-ray powder diffraction pattern (XRPD) of amorphous Risdiplam.

FIG. 2 shows a characteristic XRPD of Risdiplam Form 1.

FIG. 3 shows a characteristic XRPD of Risdiplam Form 2.

FIG. 4 shows a characteristic XRPD of Risdiplam Form 3.

FIG. 5 shows a characteristic XRPD of Risdiplam Form 4.

FIG. 6 shows a characteristic XRPD of Risdiplam Form 2.

FIG. 7 shows a characteristic XRPD of Risdiplam Form 5.

FIG. 8 shows a characteristic solid state $^{13}$C NMR spectrum of form 2 of Risdiplam (Full range—200-0 ppm).

FIG. 9 shows a characteristic solid state $^{13}$C NMR spectrum of form 3 of Risdiplam (Full range—200-0 ppm).

FIG. 10 shows a characteristic solid state $^{13}$C NMR spectrum of form 4 of Risdiplam (Full range—200-0 ppm).

DETAILED DESCRIPTION OF THE DISCLOSURE

The present disclosure encompasses solid state forms of Risdiplam, including crystalline polymorphs of Risdiplam, processes for preparation thereof, and pharmaceutical compositions thereof.

A solid state form (or polymorph) may be referred to herein as polymorphically pure or as substantially free of any other solid state (or polymorphic) forms. As used herein in this context, the expression "substantially free of any other forms" will be understood to mean that the solid state form contains about 20% (w/w) or less, about 10% (w/w) or less, about 5% (w/w) or less, about 2% (w/w) or less, about 1% (w/w) or less, or about 0% of any other forms of the subject compound as measured, for example, by XRPD. Thus, a crystalline polymorph of Risdiplam described herein as substantially free of any other solid state forms would be understood to contain greater than about 80% (w/w), greater than about 90% (w/w), greater than about 95% (w/w), greater than about 98% (w/w), greater than about 99% (w/w), or about 100% of the subject crystalline polymorph of Risdiplam. In some embodiments of the disclosure, the described crystalline polymorph of Risdiplam may contain from about 1% to about 20% (w/w), from about 5% to about 20% (w/w), or from about 5% to about 10% (w/w) of one or more other crystalline polymorph of the same Risdiplam.

Depending on which other crystalline polymorphs a comparison is made, the crystalline polymorphs of Risdiplam of the present disclosure has advantageous properties selected from at least one of the following: chemical purity, flowability, solubility, dissolution rate, morphology or crystal habit, stability—such as chemical stability as well as thermal and mechanical stability with respect to polymorphic conversion, stability towards dehydration and/or storage stability, low content of residual solvent, a lower degree of hygroscopicity, flowability, and advantageous processing and handling characteristics such as compressibility, and bulk density.

A solid state form, such as a crystal form or an amorphous form, may be referred to herein as being characterized by graphical data "as depicted in" or "as substantially depicted in" a Figure. Such data include, for example, powder X-ray diffractograms and solid state NMR spectra. As is well-known in the art, the graphical data potentially provides additional technical information to further define the respective solid state form (a so-called "fingerprint") which cannot necessarily be described by reference to numerical values or peak positions alone. In any event, the skilled person will understand that such graphical representations of data may be subject to small variations, e.g., in peak relative intensities and peak positions due to certain factors such as, but not limited to, variations in instrument response and variations in sample concentration and purity, which are well known to the skilled person. Nonetheless, the skilled person would readily be capable of comparing the graphical data in the Figures herein with graphical data generated for an unknown crystal form and confirm whether the two sets of graphical data are characterizing the same crystal form or two different crystal forms. A crystal form of Risdiplam referred to herein as being characterized by graphical data "as depicted in" or "as substantially depicted in" a Figure will thus be understood to include any crystal forms of Risdiplam characterized with the graphical data having such small variations, as are well known to the skilled person, in comparison with the Figure.

As used herein, and unless stated otherwise, the term "anhydrous" in relation to crystalline forms of Risdiplam, relates to a crystalline form of Risdiplam which does not include any crystalline water (or other solvents) in a defined, stoichiometric amount within the crystal. Moreover, an "anhydrous" form would typically not contain more than 1% (w/w), of either water or organic solvents as measured for example by TGA.

The term "solvate," as used herein and unless indicated otherwise, refers to a crystal form that incorporates a solvent in the crystal structure. When the solvent is water, the solvate is often referred to as a "hydrate." The solvent in a solvate may be present in either a stoichiometric or in a non-stoichiometric amount.

As used herein, the term "isolated" in reference to a crystalline polymorph of Risdiplam of the present disclosure corresponds to a crystalline polymorph of Risdiplam that is physically separated from the reaction mixture in which it is formed.

As used herein, unless stated otherwise, the XRPD measurements are taken using copper Kα radiation wavelength 1.54187 Å. XRPD peaks reported herein are measured using CuK α radiation, λ=1.54187 Å, typically at a temperature of 25±3° C.

A thing, e.g., a reaction mixture, may be characterized herein as being at, or allowed to come to "room temperature" or "ambient temperature", often abbreviated as "RT." This means that the temperature of the thing is close to, or the same as, that of the space, e.g., the room or fume hood, in which the thing is located. Typically, room temperature is from about 20° C. to about 30° C., or about 22° C. to about 27° C., or about 25° C.

The amount of solvent employed in a chemical process, e.g., a reaction or crystallization, may be referred to herein as a number of "volumes" or "vol" or "V." For example, a material may be referred to as being suspended in 10 volumes (or 10 vol or 10V) of a solvent. In this context, this expression would be understood to mean milliliters of the solvent per gram of the material being suspended, such that suspending a 5 grams of a material in 10 volumes of a solvent means that the solvent is used in an amount of 10 milliliters of the solvent per gram of the material that is being suspended or, in this example, 50 mL of the solvent. In another context, the term "v/v" may be used to indicate the number of volumes of a solvent that are added to a liquid mixture based on the volume of that mixture. For example, adding solvent X (1.5 v/v) to a 100 ml reaction mixture would indicate that 150 mL of solvent X was added.

A process or step may be referred to herein as being carried out "overnight." This refers to a time interval, e.g., for the process or step, that spans the time during the night, when that process or step may not be actively observed. This time interval is from about 8 to about 20 hours, or about 10-18 hours, in some cases about 16 hours.

As used herein, the term "reduced pressure" refers to a pressure that is less than atmospheric pressure. For example, reduced pressure is about 10 mbar to about 50 mbar.

As used herein and unless indicated otherwise, the term "ambient conditions" refer to atmospheric pressure and a temperature of 22-24° C.

The present disclosure includes a crystalline polymorph of Risdiplam, designated Form 1. The crystalline Form 1 of Risdiplam may be characterized by data selected from one or more of the following: an X-ray powder diffraction pattern substantially as depicted in FIG. 2; an X-ray powder diffraction pattern having peaks at 4.2, 8.3, 24.0, 25.6 and 29.3 degrees 2-theta±0.2 degrees 2-theta; and combinations of these data.

Crystalline Form 1 of Risdiplam may be further characterized by an X-ray powder diffraction pattern having peaks at 4.2, 8.3, 24.0, 25.6 and 29.3 degrees 2-theta±0.2 degrees 2-theta, and also having any one, two, three, four or five additional peaks selected from 12.7, 16.7, 19.7, 22.4 and 25.1 degrees 2-theta±0.2 degrees 2-theta.

Crystalline Form 1 of Risdiplam may alternatively be characterized by an X-ray powder diffraction pattern having peaks at 4.2, 8.3, 12.7, 16.7, 19.7, 22.4, 24.0, 25.1, 25.6 and 29.3 degrees 2-theta±0.2 degrees 2-theta.

In embodiments of the present disclosure, crystalline Form 1 of Risdiplam is isolated.

Crystalline Form 1 of Risdiplam may be anhydrous.

Crystalline Form 1 of Risdiplam may be characterized by each of the above characteristics alone or by all possible combinations, e.g., an XRPD pattern having peaks at 4.2, 8.3, 24.0, 25.6 and 29.3 degrees 2-theta±0.2 degrees 2-theta; an XRPD pattern as depicted in FIG. 2; and combinations thereof.

The present disclosure additionally includes a crystalline polymorph of Risdiplam, designated Form 2. The crystalline Form 2 of Risdiplam may be characterized by data selected from one or more of the following: an X-ray powder diffraction pattern substantially as depicted in FIG. 3 or FIG. 6; an X-ray powder diffraction pattern having peaks at 7.4, 15.7, 24.6, 26.0 and 28.2 degrees 2-theta±0.2 degrees 2-theta; a solid state $^{13}$C NMR spectrum substantially as depicted in FIG. 8; a solid state $^{13}$C NMR spectrum having peaks at 157.9, 145.6, 134.2, 128.9 and 111.1 ppm±0.2 ppm; a solid state $^{13}$C NMR spectrum having the following chemical shift absolute differences from a reference peak at 94.4 ppm±0.2 ppm of 63.5, 51.3, 39.8, 34.5 and 16.7 ppm±0.1 ppm; and combinations of these data.

Crystalline Form 2 of Risdiplam may be further characterized by an X-ray powder diffraction pattern having peaks at 7.4, 15.7, 24.6, 26.0 and 28.2 degrees 2-theta±0.2 degrees 2-theta, and also having any one, two, three, four or five additional peaks selected from 11.0, 12.0, 17.2, 22.0 and 26.5 degrees 2-theta±0.2 degrees 2-theta.

In embodiments of the present disclosure, crystalline Form 2 of Risdiplam is isolated. Crystalline Form 2 of Risdiplam may be a hydrate.

In embodiments, crystalline Form 2 may be a hydrate, optionally wherein the hydrate comprises 2-2.5 moles, or 2 moles or 2.5 moles of water per mole of Risdiplam.

Crystalline Form 2 of Risdiplam may be characterized by each of the above characteristics alone or by all possible combinations, e.g., an XRPD pattern having peaks at 7.4, 15.7, 24.6, 26.0 and 28.2 degrees 2-theta±0.2 degrees 2-theta; an XRPD pattern as depicted in FIG. 3 or FIG. 6; and combinations thereof.

Crystalline Form 2 of Risdiplam may be alternatively characterized by an X-ray powder diffraction pattern having peaks at 7.4, 11.0, 12.0, 15.7, 17.2, 22.0, 24.6, 26.0, 26.5 and 28.2 degrees 2-theta±0.2 degrees 2-theta.

The present disclosure further includes a crystalline polymorph of Risdiplam, designated Form 3. The crystalline Form 3 of Risdiplam may be characterized by data selected from one or more of the following: an X-ray powder diffraction pattern substantially as depicted in FIG. 4; an X-ray powder diffraction pattern having peaks at 6.0, 11.1, 16.1, 20.4 and 23.7 degrees 2-theta±0.2 degrees 2-theta; a solid state $^{13}$C NMR spectrum substantially as depicted in FIG. 9; a solid state $^{13}$C NMR spectrum having peaks at 157.6, 134.2, 126.8, 106.3 and 95.5 ppm±0.2 ppm; a solid state $^{13}$C NMR spectrum having the following chemical shift absolute differences from a reference peak at 53.4 ppm±0.2 ppm of 104.3, 80.8, 73.4, 52.9 and 42.2 ppm±0.1 ppm; and combinations of these data.

Crystalline Form 3 of Risdiplam may be further characterized by an X-ray powder diffraction pattern having peaks at 6.0, 11.2, 16.1, 20.4 and 23.7 degrees 2-theta±0.2 degrees 2-theta, and also having any one, two, three, four or five additional peaks selected from 13.9, 17.3, 18.4, 26.5 and 27.1 degrees 2-theta±0.2 degrees 2-theta.

Crystalline Form 3 of Risdiplam may be alternatively characterized by an X-ray powder diffraction pattern having peaks at 6.0, 11.1, 13.9, 16.1, 17.3, 18.4, 20.4, 23.7, 26.5 and 27.1 degrees 2-theta±0.2 degrees 2-theta.

In embodiments of the present disclosure, crystalline Form 3 of Risdiplam is isolated.

Crystalline Form 3 of Risdiplam may be an anhydrous form. Crystalline Form 3 may possess a water content of less than 1% of water, in embodiments about 0.8% as measured by Karl Fischer.

Crystalline Form 3 of Risdiplam may be characterized by each of the above characteristics alone or by all possible combinations, e.g., an XRPD pattern having peaks at 6.0, 11.2, 16.1, 20.4 and 23.7 degrees 2-theta±0.2 degrees 2-theta; an XRPD pattern as depicted in FIG. 4, and combinations thereof.

Form 3 is characterized by needle to 'rod-like' morphology. This morphology may be beneficial for flowability properties. In addition, Form 3 is found to be stable under mass pressure of 1 ton for 3 minutes.

The present disclosure further includes a crystalline polymorph of Risdiplam, designated Form 4. The crystalline Form 4 of Risdiplam may be characterized by data selected from one or more of the following: an X-ray powder diffraction pattern substantially as depicted in FIG. 5; an X-ray powder diffraction pattern having peaks at 10.6, 13.5, 14.9, 24.3, and 25.3 degrees 2-theta±0.2 degrees 2-theta; a solid state $^{13}C$ NMR spectrum substantially as depicted in FIG. 10; a solid state $^{13}C$ NMR spectrum having peaks at 158.0, 153.6, 143.4, 132.9 and 104.5 ppm±0.2 ppm; a solid state $^{13}C$ NMR spectrum having the following chemical shift absolute differences from a reference peak at 94.8 ppm±0.2 ppm of 63.2, 58.9, 48.6, 38.1 and 9.7 ppm±0.1 ppm; and combinations of these data.

Crystalline Form 4 of Risdiplam may be further characterized by an X-ray powder diffraction pattern having peaks at 10.6, 13.5, 14.9, 24.3, and 25.3 degrees 2-theta±0.2 degrees 2-theta, and also having any one, two, three, four or five additional peaks selected from 5.9, 7.4, 11.1, 15.4 and 19.3 degrees 2-theta±0.2 degrees 2-theta.

Crystalline Form 4 of Risdiplam may be alternatively characterized by an X-ray powder diffraction pattern having peaks at 5.9, 7.4, 10.6, 11.1, 13.5, 14.9, 15.4, 19.3, 24.3, and 25.3 degrees 2-theta±0.2 degrees 2-theta.

In embodiments of the present disclosure, crystalline Form 4 of Risdiplam is isolated.

Crystalline Form 4 of Risdiplam may be a hydrate.

Crystalline Form 4 of Risdiplam may be characterized by each of the above characteristics alone or by all possible combinations, e.g., an XRPD pattern having peaks at 10.6, 13.5, 14.9, 24.3, and 25.3 degrees 2-theta±0.2 degrees 2-theta; an XRPD pattern as depicted in FIG. 5, and combinations thereof.

The present disclosure further includes a crystalline polymorph of Risdiplam, designated Form 5. The crystalline Form 5 of Risdiplam may be characterized by data selected from one or more of the following: an X-ray powder diffraction pattern substantially as depicted in FIG. 7; an X-ray powder diffraction pattern having peaks at 5.4, 10.4, 13.9, 17.6 and 24.4 degrees 2-theta±0.2 degrees 2-theta; and combinations of these data.

Crystalline Form 5 of Risdiplam may be further characterized by an X-ray powder diffraction pattern having peaks at 5.4, 10.4, 13.9, 17.6 and 24.4 degrees 2-theta±0.2 degrees 2-theta, and also having any one, two, three, four or five additional peaks selected from 23.5, 25.3, 26.1, 27.9 and 30.7 degrees 2-theta±0.2 degrees 2-theta.

Crystalline Form 5 of Risdiplam may be alternatively characterized by an X-ray powder diffraction pattern having peaks at 5.4, 10.4, 13.9, 17.6, 23.5, 24.4, 25.3, 26.1, 27.9 and 30.7 degrees 2-theta±0.2 degrees 2-theta.

In embodiments of the present disclosure, crystalline Form 5 of Risdiplam is isolated.

Crystalline Form 5 of Risdiplam may be a hydrate, preferably trihydrate.

Crystalline Form 5 of Risdiplam may be characterized by each of the above characteristics alone or by all possible combinations, e.g., an XRPD pattern having peaks at 5.4, 10.4, 13.9, 17.6 and 24.4 degrees 2-theta±0.2 degrees 2-theta; an XRPD pattern as depicted in FIG. 7, and combinations thereof.

The present disclosure further includes amorphous Risdiplam, as depicted in FIG. 1.

The above amorphous Risdiplam can be used to prepare other crystalline polymorphs of Risdiplam, Risdiplam salts and their solid state forms.

The present disclosure encompasses a process for preparing other solid state forms of Risdiplam, Risdiplam salts and their solid state forms thereof. The process includes preparing any one of Risdiplam, salts thereof, and solid state forms of Risdiplam by the processes of the present disclosure, and converting it to other Risdiplam forms or salts.

The present disclosure provides the above described crystalline polymorphs of Risdiplam for use in the preparation of pharmaceutical compositions including crystalline polymorphs of Risdiplam, Risdiplam salts and their solid state forms.

The present disclosure also encompasses the use of crystalline polymorphs of Risdiplam of the present disclosure for the preparation of pharmaceutical compositions including crystalline polymorphs of Risdiplam, Risdiplam salts and their solid state forms.

The present disclosure includes processes for preparing the above mentioned pharmaceutical compositions. The processes include combining any one or a combination of the crystalline polymorphs of Risdiplam of the present disclosure with at least one pharmaceutically acceptable excipient.

Pharmaceutical formulations of the present disclosure contain any one or a combination of the solid state forms of Risdiplam of the present disclosure. In addition to the active ingredient, the pharmaceutical formulations of the present disclosure can contain one or more excipients. Excipients are added to the formulation for a variety of purposes.

Diluents increase the bulk of a solid pharmaceutical composition, and can make a pharmaceutical dosage form containing the composition easier for the patient and caregiver to handle. Diluents for solid compositions include, for example, microcrystalline cellulose (e.g. Avicel®), microfine cellulose, lactose, starch, pregelatinized starch, calcium carbonate, calcium sulfate, sugar, dextrates, dextrin, dextrose, dibasic calcium phosphate dihydrate, tribasic calcium phosphate, kaolin, magnesium carbonate, magnesium oxide, maltodextrin, mannitol, polymethacrylates (e.g. Eudragit®), potassium chloride, powdered cellulose, sodium chloride, sorbitol, and talc.

Solid pharmaceutical compositions that are compacted into a dosage form, such as a tablet, can include excipients whose functions include helping to bind the active ingredient and other excipients together after compression. Binders for solid pharmaceutical compositions include acacia, alginic acid, carbomer (e.g. carbopol), carboxymethylcellulose sodium, dextrin, ethyl cellulose, gelatin, guar gum, hydrogenated vegetable oil, hydroxyethyl cellulose, hydroxypropyl cellulose (e.g. Klucel®), hydroxypropyl methyl cellulose (e.g. Methocel®), liquid glucose, magnesium aluminum silicate, maltodextrin, methylcellulose, polymethacrylates, povidone (e.g. Kollidon®, Plasdone®), pregelatinized starch, sodium alginate, and starch.

The dissolution rate of a compacted solid pharmaceutical composition in the patient's stomach can be increased by the addition of a disintegrant to the composition. Disintegrants include alginic acid, carboxymethylcellulose calcium, carboxymethylcellulose sodium (e.g. Ac-Di-Sol®, Primellose®), colloidal silicon dioxide, croscarmellose sodium, crospovidone (e.g. Kollidon®, Polyplasdone®), guar gum, magnesium aluminum silicate, methyl cellulose, microcrystalline cellulose, polacrilin potassium, powdered cellulose, pregelatinized starch, sodium alginate, sodium starch glycolate (e.g. Explotab®), and starch.

Glidants can be added to improve the flowability of a non-compacted solid composition and to improve the accuracy of dosing. Excipients that can function as glidants include colloidal silicon dioxide, magnesium trisilicate, powdered cellulose, starch, talc, and tribasic calcium phosphate.

When a dosage form such as a tablet is made by the compaction of a powdered composition, the composition is subjected to pressure from a punch and dye. Some excipients and active ingredients have a tendency to adhere to the surfaces of the punch and dye, which can cause the product to have pitting and other surface irregularities. A lubricant can be added to the composition to reduce adhesion and ease the release of the product from the dye. Lubricants include magnesium stearate, calcium stearate, glyceryl monostearate, glyceryl palmitostearate, hydrogenated castor oil, hydrogenated vegetable oil, mineral oil, polyethylene glycol, sodium benzoate, sodium lauryl sulfate, sodium stearyl fumarate, stearic acid, talc, and zinc stearate.

Flavoring agents and flavor enhancers make the dosage form more palatable to the patient. Common flavoring agents and flavor enhancers for pharmaceutical products that can be included in the composition of the present disclosure include maltol, vanillin, ethyl vanillin, menthol, citric acid, fumaric acid, ethyl maltol, and tartaric acid.

Solid and liquid compositions can also be dyed using any pharmaceutically acceptable colorant to improve their appearance and/or facilitate patient identification of the product and unit dosage level.

In liquid pharmaceutical compositions of the present disclosure, Risdiplam and any other solid excipients can be dissolved or suspended in a liquid carrier such as water, vegetable oil, alcohol, polyethylene glycol, propylene glycol, or glycerin.

Liquid pharmaceutical compositions can contain emulsifying agents to disperse uniformly throughout the composition an active ingredient or other excipient that is not soluble in the liquid carrier. Emulsifying agents that can be useful in liquid compositions of the present invention include, for example, gelatin, egg yolk, casein, cholesterol, acacia, tragacanth, chondrus, pectin, methyl cellulose, carbomer, cetostearyl alcohol, and cetyl alcohol.

Liquid pharmaceutical compositions of the present disclosure can also contain a viscosity enhancing agent to improve the mouth-feel of the product and/or coat the lining of the gastrointestinal tract. Such agents include acacia, alginic acid bentonite, carbomer, carboxymethylcellulose calcium or sodium, cetostearyl alcohol, methyl cellulose, ethylcellulose, gelatin guar gum, hydroxyethyl cellulose, hydroxypropyl cellulose, hydroxypropyl methyl cellulose, maltodextrin, polyvinyl alcohol, povidone, propylene carbonate, propylene glycol alginate, sodium alginate, sodium starch glycolate, starch tragacanth, xanthan gum, and combinations thereof.

Sweetening agents such as sorbitol, saccharin, sodium saccharin, sucrose, aspartame, fructose, mannitol, and invert sugar can be added to improve the taste.

Preservatives and chelating agents such as alcohol, sodium benzoate, butylated hydroxyl toluene, butylated hydroxyanisole, and ethylenediamine tetraacetic acid can be added at levels safe for ingestion to improve storage stability.

According to the present disclosure, a liquid composition can also contain a buffer such as gluconic acid, lactic acid, citric acid, or acetic acid, sodium gluconate, sodium lactate, sodium citrate, or sodium acetate. Selection of excipients and the amounts used can be readily determined by the formulation scientist based upon experience and consideration of standard procedures and reference works in the field.

The solid compositions of the present disclosure include powders, granulates, aggregates, and compacted compositions. The dosages include dosages suitable for oral, buccal, rectal, parenteral (including subcutaneous, intramuscular, and intravenous), inhalant, and ophthalmic administration. Although the most suitable administration in any given case will depend on the nature and severity of the condition being treated, in embodiments the route of administration is oral. The dosages can be conveniently presented in unit dosage form and prepared by any of the methods well-known in the pharmaceutical arts.

Dosage forms include solid dosage forms like tablets, powders, capsules, suppositories, sachets, troches, and lozenges, as well as liquid syrups, suspensions, and elixirs.

The dosage form of the present disclosure can be a capsule containing the composition, such as a powdered or granulated solid composition of the present disclosure, within either a hard or soft shell. The shell can be made from gelatin and optionally contain a plasticizer such as glycerin and/or sorbitol, an opacifying agent and/or colorant.

The active ingredient and excipients can be formulated into compositions and dosage forms according to methods known in the art.

A composition for tableting or capsule filling can be prepared by wet granulation. In wet granulation, some or all of the active ingredients and excipients in powder form are blended and then further mixed in the presence of a liquid, typically water, that causes the powders to clump into granules. The granulate is screened and/or milled, dried, and then screened and/or milled to the desired particle size. The granulate can then be tableted, or other excipients can be added prior to tableting, such as a glidant and/or a lubricant.

A tableting composition can be prepared conventionally by dry blending. For example, the blended composition of the actives and excipients can be compacted into a slug or a sheet and then comminuted into compacted granules. The compacted granules can subsequently be compressed into a tablet.

As an alternative to dry granulation, a blended composition can be compressed directly into a compacted dosage form using direct compression techniques. Direct compression produces a more uniform tablet without granules. Excipients that are particularly well suited for direct compression tableting include microcrystalline cellulose, spray dried lactose, dicalcium phosphate dihydrate, and colloidal silica. The proper use of these and other excipients in direct compression tableting is known to those in the art with experience and skill in particular formulation challenges of direct compression tableting.

A capsule of the present disclosure can include any of the aforementioned blends and granulates that were described with reference to tableting, but they are not subjected to a final tableting step.

Risdiplam may be formulated for administration to a mammal, in embodiments a human, by injection. Risdiplam can be formulated, for example, as a viscous liquid solution or suspension, such as a clear solution, for injection. The formulation can contain one or more solvents. A suitable solvent can be selected by considering the solvent's physical and chemical stability at various pH levels, viscosity (which would allow for syringeability), fluidity, boiling point, miscibility, and purity. Suitable solvents include alcohol USP, benzyl alcohol NF, benzyl benzoate USP, and Castor oil USP. Additional substances can be added to the formulation such as buffers, solubilizers, and antioxidants, among others. Ansel et al., Pharmaceutical Dosage Forms and Drug Delivery Systems, 7th ed.

The crystalline polymorphs of Risdiplam and the pharmaceutical compositions and/or formulations of Risdiplam of the present disclosure can be used as medicaments, in embodiments for the treatment of SMA.

The present disclosure also provides methods of treating SMA by administering a therapeutically effective amount of any one or a combination of the crystalline polymorphs of Risdiplam of the present disclosure, or at least one of the above pharmaceutical compositions and/or formulations, to a subject in need of the treatment.

Having thus described the disclosure with reference to particular preferred embodiments and illustrative examples, those in the art can appreciate modifications to the disclosure as described and illustrated that do not depart from the spirit and scope of the disclosure as disclosed in the specification. The Examples are set forth to aid in understanding the disclosure but are not intended to, and should not be construed to limit its scope in any way.

Powder X-Ray Diffraction ("XRPD") Method

Powder X-ray Diffraction was performed on an X-Ray powder diffractometer X'pert Pro; CuKα radiation ($\lambda$=1.54184 Å); X'Celerator detector with active length 2.022 degrees 2-theta; laboratory temperature 25±3° C.; zero background sample holders. Prior to analysis, the samples were gently ground using a mortar and pestle to obtain a fine powder. The analysis of form 1 and form 3 was done using silicon powder as an internal standard; the position of the silicon (Si) peak was corrected to silicone theoretical peak: 28.45 degrees two theta and the positions of the measured peaks were corrected respectively.

Measurement Parameters:
  Scan range: 3-40 degrees 2-theta
  Scan mode: continuous
  Step size: 0.0167 degrees
  Time per Step: 37 seconds $^{13}$C Solid-State NMR Method Solid-state NMR spectra was measured at 11.7 T using a Bruker Avance III HD 500 US/WB NMR spectrometer. The $^{13}$C CP/MAS NMR spectra employing cross-polarization were acquired using the standard pulse scheme at spinning frequency of 12 kHz (ssNMR of form 1, form 2, and form 4) or 18 kHz (ssNMR of form 3, and form 5). The recycle delay was 8 s and the cross-polarization contact time was 2 ms. The strength of spin-locking fields $B_1(^{13}C)$ expressed in frequency units $\omega\frac{1}{2}\pi=\gamma B1$ was 64 kHz.

The $^{13}$C NMR scale was referenced to α-glycine (176.03 ppm). Frictional heating of the spinning samples was offset by active cooling, and the temperature calibration was performed with $Pb(NO_3)_2$. The NMR spectrometer was completely calibrated and all experimental parameters were carefully optimized prior the investigation. Magic angle was set using KBr during standard optimization procedure and homogeneity of magnetic field was optimized using adamantane sample (resulting line-width at half-height $\Delta v\frac{1}{2}$ was less than 3.5 Hz at 250 ms of acquisition time).

EXAMPLES

Preparation of Starting Materials

Risdiplam can be prepared according to methods known from the literature, for example in the procedure described in U.S. Pat. No. 9,969,754.

Example 1: Preparation of Risdiplam Amorphous Form

Risdiplam (520 mg) was subjected to milling in ball mill (zirconium oxide jar, 7 zirconium oxide balls, ϕ=9 mm, frequency: 600 rpm, time: 1 hour). Obtained solid was analyzed by XRPD. Risdiplam amorphous form was obtained. XRPD pattern is shown in FIG. 1.

Example 2: Preparation of Risdiplam Form 1

Risdiplam amorphous form (200 mg) was suspended in methanol (2 mL) at room temperature. Obtained suspension was mixed additionally for 20 hours at 25° C. The solid was isolated by vacuum filtration.

Obtained solid was analyzed by XRPD. Risdiplam form 1 was obtained. XRPD pattern is shown in FIG. 2.

Same procedure can be repeated with acetonitrile instead of methanol to obtain form 1.

Example 3: Preparation of Risdiplam Form 1

Risdiplam amorphous form (300 mg) was suspended in ethanol (3 mL) at room temperature. Obtained suspension was mixed additionally for 20 hours at 25° C. The solid was isolated by vacuum filtration. Obtained solid was analyzed by XRPD. Risdiplam form 1 was obtained.

Example 4: Preparation of Risdiplam Form 1

A suspension of Risdiplam amorphous form (~22 mg) in acetonitrile (~10 mL) was heated to the boiling point. The suspension was cooled down to room temperature. Then, the solid was isolated by vacuum filtration. Obtained solid was analyzed by XRPD. Risdiplam form 1 was obtained. Same procedure can be repeated with either acetone, diethyl ether, ethyl acetate, methyl ethyl ketone, methanol or ethanol instead of acetonitrile to obtain the desired form 1.

Example 5: Preparation of Risdiplam Form 1

Risdiplam amorphous (512 mg) was dissolved in ~120 ml of ethanol 96% by heating up to boiling point. 82.5 ml of acetone at temperature of 10° C. was added dropwise to the solution the solution was stirred for 18 hours at 350 rpm. The solid was isolated by vacuum filtration and then dried by vacuum dryer at RT for 15 minutes. The obtained solid was analyzed by XRPD. Risdiplam Form 1 was obtained. Isolated: 364 mg, Yield: 71.09%.

Example 6: Preparation of Risdiplam Form 2

Risdiplam amorphous form (600 mg) was suspended in water (6 mL) at room temperature for 20 hours. The solid was isolated by vacuum filtration. Obtained solid was analyzed by XRPD. Risdiplam form 2 was obtained. XRPD pattern is shown in FIG. 3.

Example 7: Preparation of Risdiplam Form 2

A suspension of Risdiplam amorphous form (25 mg) in water (10 mL) was heated to the boiling point. The suspension was cooled down to room temperature. The solid was isolated by vacuum filtration. Obtained solid was analyzed by XRPD. Risdiplam form 2 was obtained.

Example 8: Preparation of Risdiplam Form 2

Risdiplam amorphous (515 mg) was dissolved in ~120 ml of ethanol 96% by heating up to boiling point (78° C.). 300 ml of water at temperature of 5° C. was added dropwise to the solution, the solution was stirred for 18 hours at 350 rpm. The obtained solid was isolated by vacuum filtration and then dried by vacuum dryer at room temperature for 15 minutes. The obtained solid was analyzed by XRPD. Form 2 was obtained. The XRPD is shown in FIG. 6. Isolated: 436 mg, Yield: 84.66%.

Example 9: Preparation of Risdiplam Form 2

Risdiplam amorphous (1 gram) was subjected to 100% relative humidity at 25° C. for 7 days. Obtained solid was analysed by XRPD. Risdiplam Form 2 was obtained Example 10: Preparation of Risdiplam Form 3

Risdiplam form 2 (415 mg) was dried under vacuum at 100° C. for 40 minutes. Obtained solid was analyzed by XRPD. Risdiplam Form 3 was obtained. XRPD pattern is given in FIG. 4.

Example 11: Preparation of Risdiplam Form 3

Risdiplam form 2 (3.6 mg) was placed in pin hole aluminum pan then subjected to thermal treatment in DSC, according to following steps:
1. Heating up to 110° C., by heating rate of 10° C./minute
2. Isothermal heating for 15 minutes at 110° C.,
3. Cooled to room temperature.
Obtained solid was analyzed by XRPD. Risdiplam form 3 was obtained.

Example 12: Preparation of Risdiplam Form 3

Risdiplam form 2 (527 mg) was dried in dryer at temperature of 60° C. for 2 hours. The obtained solid was analyzed by XRPD. Risdiplam Form 3 was obtained. Isolated: 456.8 mg Example 13: Preparation of Risdiplam Form 4

Risdiplam amorphous (1 gram) was subjected to relative humidity of either 20%, 40%, or 60% at 25° C. for 7 days. Obtained solid was analysed by XRPD. Risdiplam Form 4 was obtained. XRPD pattern is shown in FIG. 5.

Example 14: Preparation of Risdiplam Form 5

Risdiplam amorphous (262 mg), was dissolved in 54 ml of ethanol 96% by heating up to 78° C. 27 ml of water at room temperature was added dropwise to the solution and additional stirring at 350 rpm for 16 hours was performed. The solid obtained was isolated by vacuum filtration and then dried by vacuum dryer at 25° C. for 15 minutes. The solid was analyzed by XRPD. Risdiplam Form 5 was obtained. Isolated: 217 mg, Yield: 82.08%. XRPD pattern is shown in FIG. 7.

Example 15: Preparation of Risdiplam Form 5

Risdiplam amorphous (102 mg) was dissolved in 30 ml of ethanol/water solvent mixture (2:1) by heating up to 78° C. and then Solution was left at room temperature for 3 days. The obtained solid was isolated by vacuum filtration and then dried by vacuum dryer at 25° C. for 15 minutes. Obtained solid was analysed by XRPD. Risdiplam Form 5 was obtained. Isolated: 55 mg, Yield: 53.92%.

Example 16: Preparation of Risdiplam Form 5

Risdiplam amorphous (105 mg), was dissolved in 22 ml of ethanol/water mixture (2:1) by heating up to 78° C. Solution was stirred in ice bath and cooled down to 0° C. Solid was observed after 3 hours. The solid was isolated by vacuum filtration and additionally dried by vacuum dryer at 25° C. for 15 minutes. Obtained solid was analyzed by XRPD. Risdiplam Form 5 was obtained.

What is claimed is:

1. A crystalline form of Risdiplam designated form 2, characterized by data selected from one or more of the following:
   (i) an X-ray powder diffraction pattern having peaks at 7.4, 15.7, 24.6, 26.0 and 28.2 degrees two theta±0.2 degrees two theta;
   (ii) an X-ray powder diffraction pattern having peaks 7.4, 15.7, 24.6, 26.0 and 28.2 degrees two theta±0.2 degrees two theta and also having any one, two, three, four or five additional peaks selected from 11.0, 12.0, 17.2, 22.0 and 26.5 degrees two theta±0.2 degrees two theta;
   (iii) an X-ray powder diffraction pattern having peaks at 7.4, 11.0, 12.0, 15.7, 17.2, 22.0, 24.6, 26.0, 26.5, and 28.2 degrees 2-theta±0.2 degrees 2-theta;
   (iv) an X-ray powder diffraction pattern substantially as depicted in FIG. 6 or substantially as depicted in FIG. 3;
   (v) a solid state $^{13}$C NMR spectrum having peaks at 144.5, 143.2, 131.5, 123.5 and 119.2 ppm±0.2 ppm
   (vi) a solid state $^{13}$C NMR spectrum having the following chemical shift absolute differences from a reference peak at 94.4 ppm±2 ppm of 63.5, 51.3, 39.8, 34.5 and 16.7 ppm±0.1;
   (vii) a solid state $^{13}$C NMR spectrum substantially as depicted in FIG. 8.

2. The crystalline form 2 according to claim 1, wherein the crystalline form is substantially free of any other solid state forms.

3. A pharmaceutical composition or formulation comprising a crystalline form according to claim 1, and at least one pharmaceutically acceptable excipient.

4. A pharmaceutical composition or formulation according to claim 3 in the form of a tablet, capsule or powder.

5. A process for preparing a pharmaceutical composition or formulation, comprising combining a crystalline form according to claim 1 with at least one pharmaceutically acceptable excipient.

6. A medicament comprising the crystalline form according to claim 1.

7. A method of treating spinal muscular atrophy comprising administering a therapeutically effective amount of a crystalline form according to claim 1 to a subject in need of treatment.

8. A crystalline form of Risdiplam designated form 3, characterized by data selected from one or more of the following:
   (i) an X-ray powder diffraction pattern having peaks at 6.0, 11.1, 16.1, 20.4 and 23.7 degrees 2-theta±0.2 degrees 2-theta;
   (ii) an X-ray powder diffraction pattern having peaks at 6.0, 11.2, 16.1, 20.4 and 23.7 degrees 2-theta±0.2 degrees 2-theta and also having any one, two, three, four or five additional peaks selected from 13.9, 17.3, 18.4, 26.5 and 27.1 degrees 2-theta±0.2 degrees 2-theta;
   (iii) an X-ray powder diffraction pattern having peaks at 6.0, 11.1, 13.9, 16.1, 17.3, 18.4, 20.4, 23.7, 26.5 and 27.1 degrees 2-theta±0.2 degrees 2-theta;
   (iv) an X-ray powder diffraction pattern substantially as depicted in FIG. 4;
   (v) a solid state $^{13}$C NMR spectrum having peaks at 157.6, 134.2, 126.8, 106.3 and 95.5 ppm±0.2 ppm;
   (vi) a solid state $^{13}$C NMR spectrum having the following chemical shift absolute differences from a reference peak at 53.4 ppm±2 ppm of 104.3, 80.8, 73.4, 52.9 and 42.2 ppm±0.1 ppm; or
   (vii) a solid state $^{13}$C NMR spectrum substantially as depicted in FIG. 9.

9. The crystalline form 3 according to claim 8, wherein the crystalline form is substantially free of any other solid state forms.

10. A pharmaceutical composition or formulation comprising a crystalline form according to claim 8, and at least one pharmaceutically acceptable excipient.

11. A pharmaceutical composition or formulation according to claim 10 in the form of a tablet, capsule or powder.

12. A process for preparing a pharmaceutical composition comprising combining a crystalline form according to claim 8 with at least one pharmaceutically acceptable excipient.

13. A medicament comprising the crystalline form according to claim 8.

14. A method of treating spinal muscular atrophy comprising administering a therapeutically effective amount of a crystalline form according to claim 8.

15. A crystalline form of Risdiplam designated form 4, characterized by data selected from one or more of the following:
   (i) 10.6, 13.5, 14.9, 24.3, and 25.3 degrees 2-theta±0.2 degrees 2-theta; or
   (ii) an X-ray powder diffraction pattern having peaks at 10.6, 13.5, 14.9, 24.3, and 25.3 degrees 2-theta±0.2 degrees 2-theta and also having any one, two, three, four or five additional peaks selected from 5.9, 7.4, 11.1, 15.4 and 19.3 degrees 2-theta±0.2 degrees 2-theta;
   (iii) an X-ray powder diffraction pattern having peaks at 5.9, 7.4, 10.6, 11.1, 13.5, 14.9, 15.4, 19.3 24.3, and 25.3 degrees 2-theta±0.2 degrees 2-theta;
   (iv) an X-ray powder diffraction pattern substantially as depicted in FIG. 5;
   (v) a solid state $^{13}$C NMR spectrum having peaks at 158.0, 153.6, 143.4, 132.9 and 104.5 ppm±0.2 ppm;
   (vi) a solid state $^{13}$C NMR spectrum having the following chemical shift absolute differences from a reference peak at 94.8 ppm±2 ppm of 63.2, 58.9, 48.6, 38.1 and 9.7 ppm±0.1 ppm; or
   (vii) a solid state $^{13}$C NMR spectrum substantially as depicted in FIG. 10.

16. The crystalline form 4 according to claim 15, wherein the crystalline form is substantially free of any other solid state forms.

17. A pharmaceutical composition or formulation comprising a crystalline form according to claim 15, and at least one pharmaceutically acceptable excipient.

18. A pharmaceutical composition or formulation according to claim 17 in the form of a tablet, capsule or powder.

19. A process for preparing a pharmaceutical composition comprising combining a crystalline form according to claim 15 with at least one pharmaceutically acceptable excipient.

20. A medicament comprising the crystalline form according to claim 15.

21. A method of treating spinal muscular atrophy comprising administering a therapeutically effective amount of a crystalline form according to claim 15.

* * * * *